C. H. CLIFT.
TEARING MACHINE.
APPLICATION FILED DEC. 30, 1920.

1,407,636.

Patented Feb. 21, 1922.
4 SHEETS—SHEET 1.

WITNESSES

INVENTOR
CHESTER H. CLIFT
BY
ATTORNEYS

C. H. CLIFT.
TEARING MACHINE.
APPLICATION FILED DEC. 30, 1920.

1,407,636.

Patented Feb. 21, 1922.
4 SHEETS—SHEET 2.

WITNESSES

INVENTOR
CHESTER H. CLIFT
BY
ATTORNEYS

C. H. CLIFT.
TEARING MACHINE.
APPLICATION FILED DEC. 30, 1920.

1,407,636.

Patented Feb. 21, 1922.
4 SHEETS—SHEET 3.

WITNESSES

Geo. W. Naylor
Hugh H. Ott

INVENTOR
CHESTER H. CLIFT
BY Munn & Co
ATTORNEYS

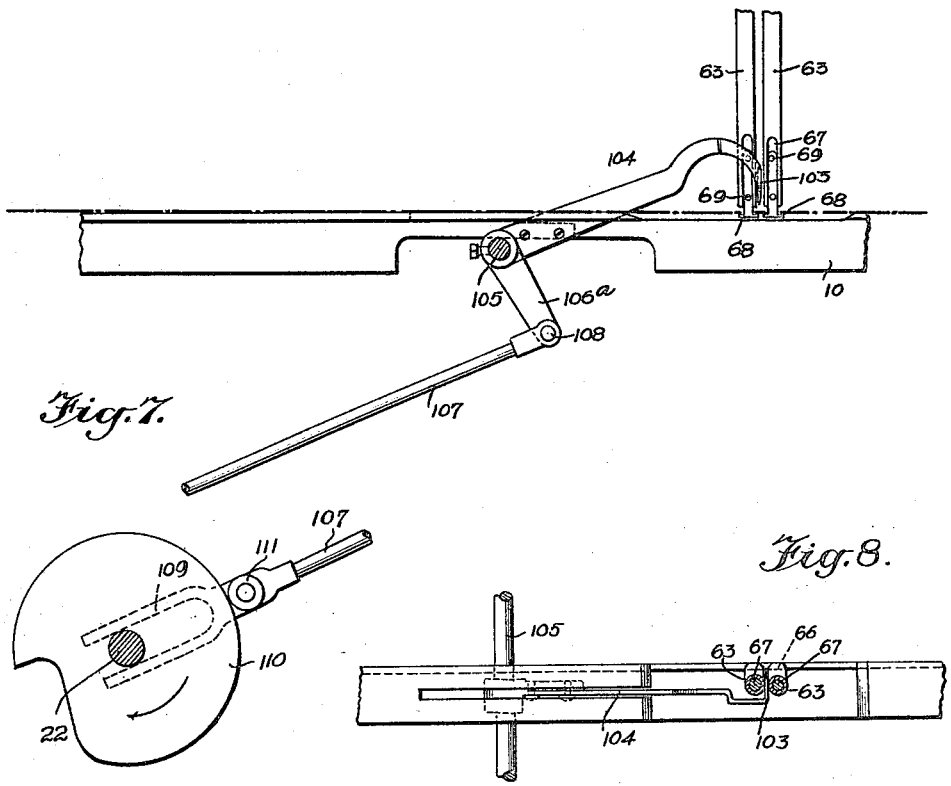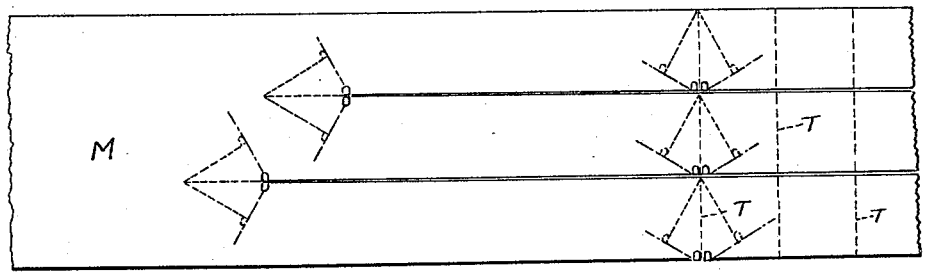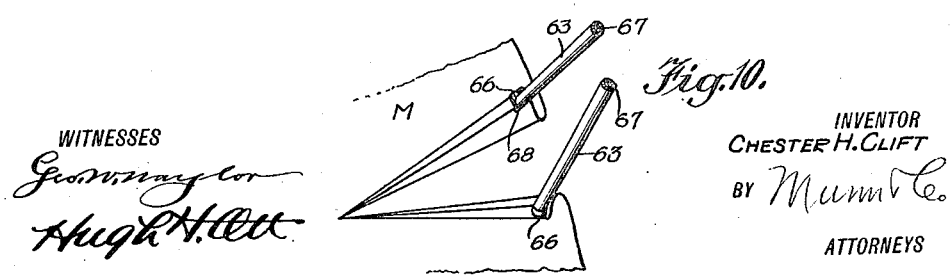

UNITED STATES PATENT OFFICE.

CHESTER HERRICK CLIFT, OF NYACK, NEW YORK.

TEARING MACHINE.

1,407,636.   Specification of Letters Patent.   Patented Feb. 21, 1922.

Application filed December 30, 1920. Serial No. 434,091.

*To all whom it may concern:*

Be it known that I, CHESTER H. CLIFT, a citizen of the United States, and a resident of Nyack, in the county of Rockland and State of New York, have invented a new and Improved Tearing Machine, of which the following is a full, clear, and exact description.

This invention relates to a tearing machine and refers particularly to a machine for mechanically tearing material fed therethrough.

The invention contemplates a machine through which the material to be torn is adapted to be fed or passed and which includes mechanism, operable to tear the same longitudinally, transversely or both longitudinally and transversely.

The invention further contemplates a machine in which the tearing mechanism is adjustable to effect the tearing of the material into strips of various widths and lengths, or into strips of various proportionate widths and lengths.

The invention further resides in the provision of means for initially cutting one of the side edges of the material or strips of material presented to the transverse tearing mechanism, prior to the tearing operation thereof.

A further aim of the invention resides in the provision of means located adjacent the intake end of the machine for initially stretching the material transversely to smooth and relieve it of wrinkles or folds whereby it will accurately register with the tearing mechanism to obtain a proper functioning of the same.

Another object in view is to produce a machine of the character set forth which is comparatively simple in construction, inexpensive to manufacture and assemble, and highly efficient in its purpose and operation.

With the foregoing objects and advantages in view, the invention consists in the novel combination and arrangement of parts hereinafter described and claimed, and while the invention is not restricted to the precise details of construction disclosed or suggested herein, still for the purpose of illustrating one practical embodiment thereof, reference is made to the accompanying drawings, in which like reference characters designate the same parts throughout the several views, and in which;

Figure 1 is a side elevation of a machine constructed in accordance with the invention.

Fig. 1ª is a diagrammatic view illustrating the Geneva movement.

Figure 7 is a detail enlarged view of the cutting knife employed in connection with each of the transverse tearing members, illustrating the relative position of the same with respect to said transverse tearing member and the cam for actuating the same.

Figure 8 is a plan view of the same.

Figure 9 is a diagrammatic plan view of the material which is torn by the machine, illustrating in dotted lines the manner in which the same is torn.

Figure 10 is a detail fragmentary perspective view illustrating the manner in which the gripping fingers of the tearing arms coact with the material to be torn.

Figures 1, 1A:
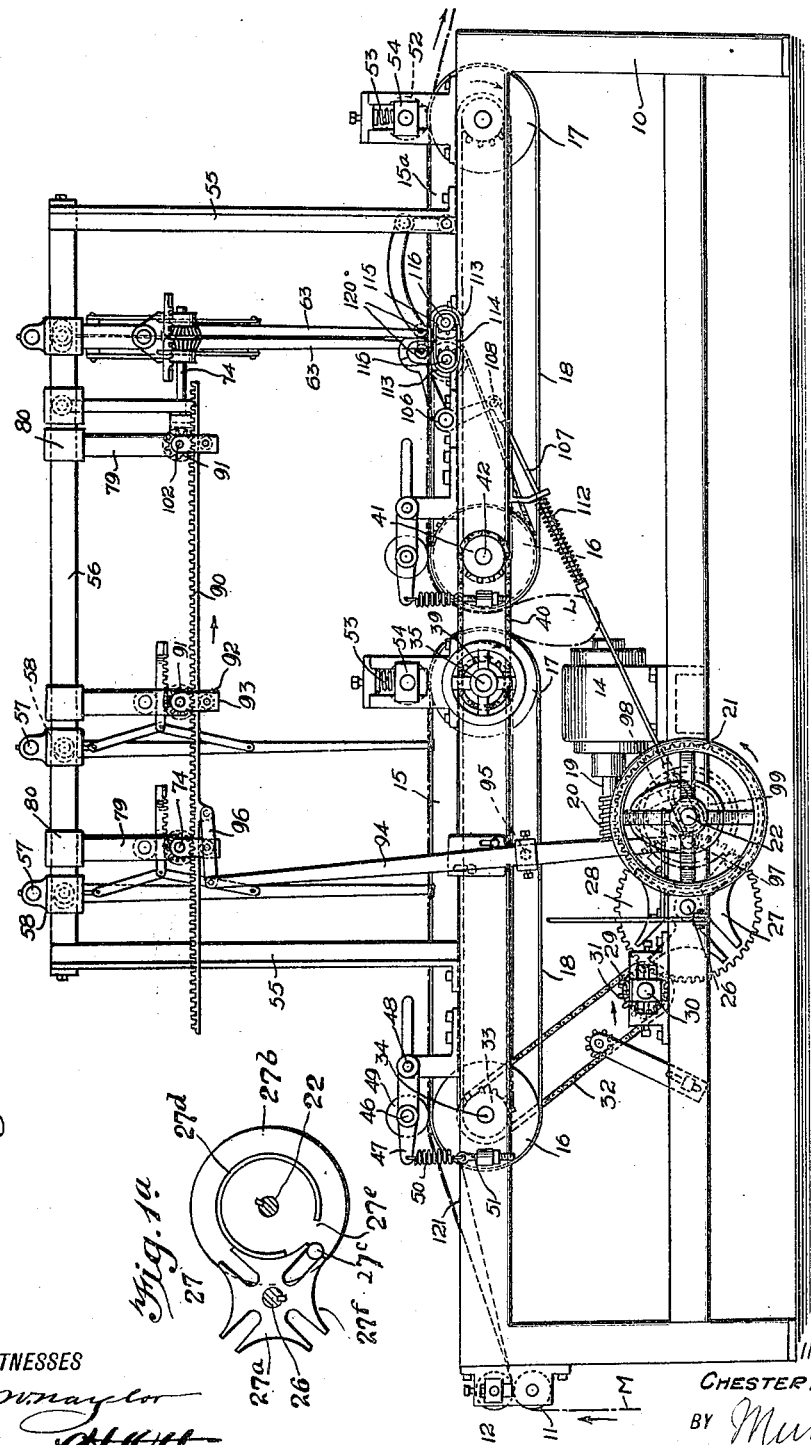
Figure 2:
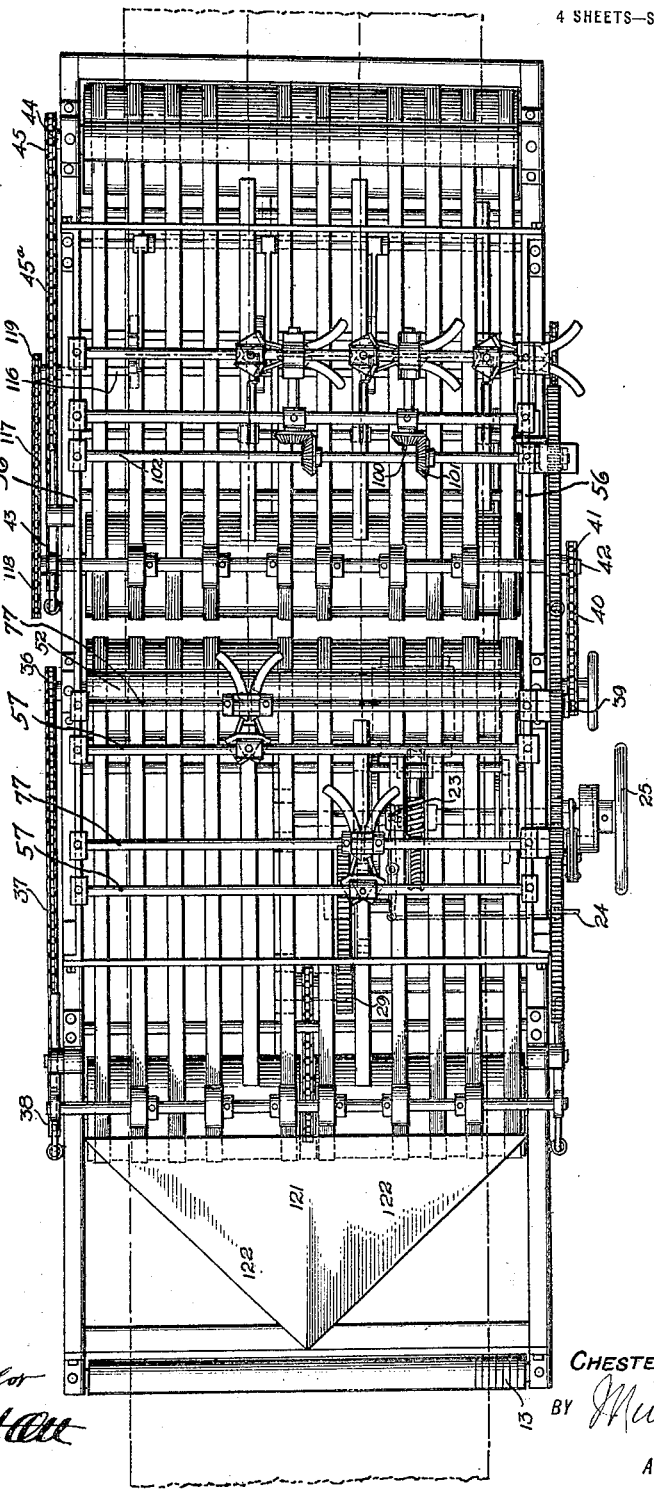
Figure 2 is a plan view thereof.
Figure 4:
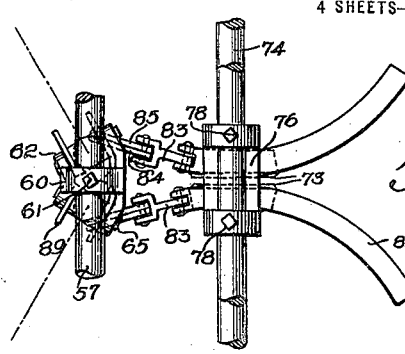
Figure 4 is a plan view of the same.
Figure 5:
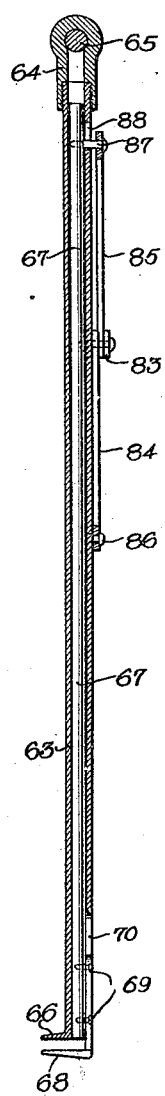
Figure 5 is a longitudinal sectional view through one of the tearing arms.
Figure 3:
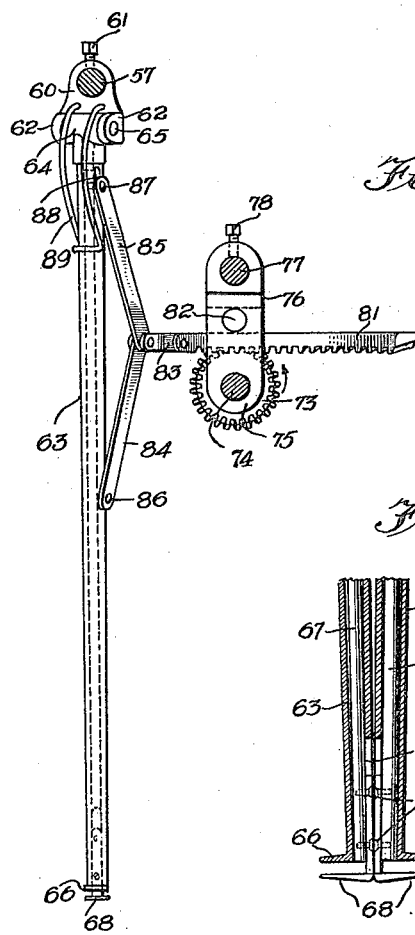
Figure 3 is an enlarged detail side elevation of one of the tearing members removed from the machine.
Figure 6:
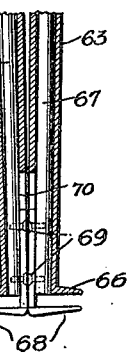
Figure 6 is a fragmentary transverse sectional view of a pair of tearing arms illustrating the relative position of the same prior to their separation.

Referring to the drawings in detail, the machine includes a supporting frame 10 provided at one end with a pair of transverse superimposed rollers 11 and 12 between which the cloth or other material to be torn is fed and which end will be hereafter termed the intake end of the machine. The upper roller 12 is preferably provided with a scale and indicia 13 adjacent one end for determining the width of the material upon which the machine is to operate and by which the operator may properly adjust and regulate the elements thereof. Preferably the entire machine is operated by a motor 14 which is mounted on the frame 10. The machine is provided with the movable supporting tables 15 and 15ª, each of which comprise a pair of longitudinally spaced drums or rollers 16 and 17 journaled in the frame and over which are trained a plurality of transversely spaced endless belts 18. The motor shaft 19 is provided with a worm 20 which meshes with the worm gear 21 loosely mounted on a transverse drive shaft 22. A clutch 23 functions when in operative position to couple the shaft 22 with the worm gear for driving the same therewith. A lever 24 suitably connected with the clutch protrudes from one side of the machine to afford means for throwing the clutch into and out of operative position. The extremity of the shaft 22 is provided with a hand wheel 25 by which the shaft may be manually rotated when the clutch is disengaged. A counter shaft 26 is journaled in the frame and arranged parallel to the drive shaft 22, and the same is adapted to be intermittently driven by the drive shaft through a Geneva movement 27. The Geneva movement 27 includes a star or cross 27$^a$ secured to the counter shaft 26 and an actuating disk 27$^b$ secured to the drive shaft 22 and is provided with a pin or trunnion 27$^c$ which coacts with the star wheel 27$^a$ or cross to rotate the shaft 26$^a$ one quarter revolution upon each revolution of the drive shaft. An annular locking flange 27$^b$ provided with spaced ends 27$^e$ is provided on the disk 27$^b$ and coacts with the concave surfaces 27$^f$ to lock the star wheel 27$^a$ against movement. A gear 28 is keyed to the counter shaft 26 and meshes with the gear 29 on the stub shaft 30. A sprocket 31 is mounted on the stub shaft and is connected by a sprocket chain 32 to the sprocket wheel 33 of the drum shaft 34 upon which the drum 16 of the movable table 15 is mounted. The drum shaft 35 upon which the drum 17 of the table 15 is mounted is provided with a sprocket 36 which is connected by a sprocket chain 37 to the sprocket wheel 38 on the drum shaft 34. The opposite extremity of the shaft 35 is provided with a sprocket wheel 39 which is connected by a sprocket chain 40 to the sprocket wheel 41. The sprocket wheel 41 is keyed to the drum shaft 42 upon which the drum 16 of the table 15$^a$ is mounted. The opposite extremity of the drum shaft 42 is provided with a sprocket wheel 43 and the drum shaft 44 of the drum 17 is provided with a sprocket wheel 45 which is connected to the sprocket wheel 43 by sprocket chain 45$^a$. By this arrangement the belts 18 are intermittently driven in the same direction and at the same rate of speed when the drive shaft 22 is in operation. A transverse shaft 46 journaled at its opposite ends in the arms 47 which are pivoted as at 48 to the frame, has mounted thereon a plurality of transversely spaced tension rollers 49 which are designed to register with and engage certain of the belts 18 for the purpose of confining the material to be torn, therebetween whereby said material will be fed through the machine. A coiled expansion spring 50 is respectively connected at its opposite ends to the free end of the arms 47 and to an adjustable eye bolt 51 carried by the frame. These tension rollers and their associated parts are employed in connection with the drums or rollers 16 of each table 15 and 15$^a$. The drums 17 of the tables 15 and 15$^a$ are each provided with a transversely superposed tension roller 52 which is normally forced into impinging contact with the belts 18 trained thereover by the coiled expansion springs 53 bearing on the journal blocks 54 in which the opposite extremities of the tension rollers are journaled.

The tearing members are supported by superposed frame work mounted on the frame 10, said frame work including the vertical standards 55 and the longitudinal side ears 56. Each of the tearing members for effecting the longitudinal tearing of the material, includes a transverse supporting rod 57, the opposite ends of which are mounted in carrier blocks 58 slidably mounted on the longitudinal bars 56 of the frame work. Each tearing member also includes a supporting head 60 which is apertured to receive the transverse rod 57 to permit of its transverse adjustment thereon, a suitable locking screw 61 serving to retain said head in its adjusted position on the same. The lower portion of the head 60 is formed with a pair of spaced apertured ears 62 projecting from the opposite sides thereof, and said ears are angularly disposed in opposite directions as illustrated. A tubular arm 63 is pivotally supported from each pair of ears 62 by a head 64 which is mounted on the shaft 65 extending through the apertured ears. By this arrangement the arms 63 are capable of swinging movements outwardly and at an opposite angle to each other to move their lower extremities upward and toward the feeding end of the machine. The lower extremity of the tubular arms are formed with a finger 66 and a rod 67 is telescopically mounted in each arm 63 for longitudinal movements therein. The lower extremity of the rod 67 is formed with a finger 68 adjustably carried thereby through the medium of the set screws 69. Preferably the lower end of the arm 63 is recessed as at 70 for the reception of the adjustable finger. The fingers 66 and 68 as illustrated are disposed in superposed relation and are adapted upon relative movement of the rod with respect to the arm, to be advanced toward or away from each other for the purpose of gripping or releasing material received therebetween. The tearing members further include means for effecting relative movements between the gripping fingers 66 and 68 and relative separation of each pair of arms 63, which means includes a pair of beveled gears 73 mounted on a common shaft 74 and confined between the furcations 75 of the block 76 which is transversely adjustable on a supporting rod 77 and secured in its adjusted positions by the retaining screw 78. The opposite extremities of the supporting rods 77 are secured in the depending arms 79 of the carrier blocks 80 which are slidably mounted on the longitudinal bars 56 of the framework. A quadrant rack 81 meshes with each beveled gear 73 and is movable between the furcations 75 upon rotation of said beveled gears. The teeth of each quadrant rack are maintained in engagement with the beveled gears through the medium of the rollers 82 which bear thereagainst for the purpose specified. One end of each quadrant rack is connected by a link 83 to the toggle arms 84 and 85. The toggle arm 84 is pivoted at its opposite end as at 86 to the tubular arm 63. The remaining toggle arm 85 is pivoted at its opposite end by the pin 87 to the rod 67, said pin extending through a slot 88 in the arm 63. A spring 89 is connected at one end to the head 60 and bears at its opposite end on the arm 63. By this arrangement rotations of the beveled gears in one direction as indicated by the arrow will move the quadrant racks 81 toward the arms 63. The initial movement of the quadrant rack will tend to effect relative separation of the outer pivoted ends of the toggle arms resulting in relative longitudinal movements of the rod 67 and the arm 63 to bring the gripping fingers 68 into gripping contact with the material, the spring 89 serving to prevent swinging of the arm outwardly until said gripping action has been effected. When this is accomplished, a direct force will be exerted against the arms 63 to swing the same on the shafts 65 against the action of the springs 89. The means for actuating the common shaft 74 includes a longitudinally movable rack bar 90, the teeth of which engage and co-act with the pinions 91 which are keyed to the shaft 74. The teeth of the rack bar 90 are held in engagement with the teeth of the pinions 91 by a roller bearing 92 supported in a bail 93 carried by the lower extremities of the arms 79. The rack is actuated by a lever 94 which is pivoted as at 95 to an adjustable fulcrum for the purpose of regulating the throw of the upper extremity of the same. The upper extremity of the lever is connected by a link 96 to the rack bar 90. The lower extremity of the lever is provided with a pin 97 which operates in the cam slot 98 provided in a cam 99 which is keyed to the operating shaft 22. By this arrangement upon each revolution of the drive shaft 22, the rack bar 90 will be reciprocated for the purpose set forth. The transverse tearing members are identical in construction and operation to the longitudinal tearing members, with the exception that the arms 63 of the same are mounted to move transversely to the feed of the cloth through the machine. In this instance the common shafts 74 upon which the beveled gears are mounted, are provided at one extremity with a beveled gear 100 which meshes with a beveled gear 101 on the transverse shaft 102, which is journaled at its opposite extremities in the depending arms 79 of the blocks 80. The shaft 102 has keyed to one of its extremities a pinion 91 with which the rack bar 90 co-acts.

A cutting knife 103 is mounted on the free extremity of the arm 104 which is pivoted on the transverse rock shaft 105 journaled in the bearings 106. The cutting edge of the knife is normally disposed between the lower ends of the arms 63 adjacent the gripper fingers in a position to effect the initial cutting of one side edge of the material or strips of material fed to the transverse depending members. The rock shaft 105 is provided with an operating arm 106ª and an actuating rod 107 is pivoted to the free extremity thereof as at 108. The opposite extremity of the rod is bifurcated as at 109 to fit the drive shaft 22. A cam 110 keyed to the drive shaft 22 co-acts with the trunnion or roller 111 to effect longitudinal shifting of the actuating rod. A spring 112 exerts a tension on the rod to normally force the trunnion or roller 111 into contact with the periphery of the cam 110. By this arrangement upon each rotation of the drive shaft the cutting edge of the knife blade will be moved into engagement with the material for cutting one of the side edges of the same. In order to provide means for holding the opposite edge of the strip during the tearing operation, tension rollers 113 are provided which are coupled for simultaneous movement through the sprocket chain 114 trained over the sprocket wheels 115. One of the transverse shafts 116 upon which the tension rollers are mounted is connected by the sprocket chain 117 to a sprocket wheel 118 on the drum shaft 42 which chain is trained over the sprocket wheel 119 keyed to the shaft 116. The tension rollers 113 directly underly the belts 18 of the movable table 15ª and tension rollers 120 are superposed with relation to the upper belt lead to confine the material thereagainst.

A smoothing element 121 is arranged at the intake end of the machine between the rollers 11 and 12 and the table 15. This element is in the nature of an inclined pointed table having oppositely beveled upper surfaces 122 which tend to stretch the cloth or material transversely from the center as the same is drawn thereover to relieve the same of wrinkles or folds thereon.

In operation of the machine, the material M is passed between the rollers 11 and 12 over the smoothing element 121 onto the table 15 between the upper leads of the belts 18 and the tension roller 49, thence under the tension roller 52 and onto the table 15ª. Preferably a loop L is made in the material between the tables 15 and 15ª for a purpose to be hereafter explained. Where it is desired to tear the cloth into longitudinal strips and subsequently tear the strips transversely, the initial longitudinal tearing operation is accomplished by hand until the longitudinal tears can be positioned adjacent the transverse tearing elements. The machine is then ready for automatic operation. The edges of the strips are passed between the fingers 66 and 68 of the longitudinal tearing members. The motor 14 is started and the clutch 23 is thrown to operative position to couple the drive shaft 22 therewith. The tables are intermittently driven and effect the feeding of the cloth or other material through the machine. Upon each intermittent arresting of the movement of the tables the longitudinal tearing members will be brought into operation to grip the cloth and effect the tearing of the same. Simultaneously the transverse tearing members will grip and tear the strips transversely as indicated at T in Figure 9 of the drawings, the cutting knife 103 having previously cut the edge of each strip as the material comes to rest. The loop L has been provided to allow for the longitudinal pull on the cloth caused by the longitudinal bearing members in order to prevent the possibility of derangement or pulling of the strips out of registry with the transverse tearing elements. The machine is adapted to be utilized for tearing the cloth transversely into as many strips as desired by the elimination of or addition thereto of the tearing elements required. Likewise the machine may be utilized for transverse or longitudinal tearing only by dismantling or removing one or the other set of tearing elements.

From the foregoing, it will be seen that a single and preferred embodiment of the invention has been set forth, but it is understood that variations and modifications which fall within the scope of the appended claims may be resorted to when found expedient.

I claim:

1. In a tearing machine, means for longitudinally tearing the material fed through the machine into strips, independent means for transversely tearing the strips into separate pieces, and a common means for actuating said tearing means.

2. In a tearing machine, means for longitudinally tearing the material fed through the machine into strips, independent means for transversely tearing the strips into separate pieces, a common means for actuating said tearing means, and means for adjusting said tearing means whereby to vary the width and length of the pieces to be torn.

3. In a tearing machine, means for feeding the material to be torn therethrough, means for tearing the same longitudinally into strips and means for tearing said strips transversely.

4. In a tearing machine, means for feeding the material to be torn therethrough, means for tearing the same longitudinally into strips, means for initially cutting one edge of each strip and means for tearing said strips transversely.

5. In a tearing machine, means for intermittently feeding the material to be torn therethrough, means operable while the material is at rest for tearing the same longitudinally into strips, and means for simultaneously tearing said strips transversely.

6. In a tearing machine, means for intermittently feeding the material to be torn therethrough, independent means operable while the material is at rest for tearing the material longitudinally and transversely.

7. A tearing machine for operating on a length of material partially torn longitudinally into strips manually, comprising means for intermittently feeding the material through the machine, means for grasping the opposite sides of the initially torn strips and effecting the relative separation of the same to tear the remainder of the material longitudinally into strips, means for cutting one edge of said strips, and means for grasping and tearing the strips transversely.

8. A tearing machine including means for feeding the material to be torn through the machine, means for tearing said material longitudinally into strips, comprising a pair of relatively separable longitudinally moveable gripping members adapted to grip the material, mechanism for actuating said members and means for tearing the strips transversely, comprising relatively separable transversely movable gripping members adapted to grip the material and mechanism for actuating the same.

9. A tearing machine including means for intermittently feeding the material to be torn through the machine, means for tearing the same longitudinally into strips, means operable when the machine is at rest for cutting the same, and means for gripping the opposite edges of the cut portions and effecting relative separation thereof to tear said strips transversely into separate pieces.

10. In a tearing machine including means for intermittently feeding the material to be torn through the machine, means for mechanically tearing the material longitudinally into strips, means operable when the intermittent feeding means is at rest for tearing the strips transversely into separate pieces comprising a head, a pair of tearing arms pivoted thereto for swinging movements, a knife mounted therebetween operable to initially cut the edge of the strips, means carried by the free extremities of the arms for gripping the opposite edges of the cut portion, and means for swinging the arms to effect relative separation thereof whereby to tear the material.

11. In a tearing machine including means for intermittently feeding the material to be torn through the machine, means for mechanically tearing the material longitudinally into strips, means operable when the intermittent feeding means is at rest for tearing the strips transversely into separate pieces comprising a head, a pair of tearing arms pivoted thereto for swinging movements, a knife mounted therebetween operable to initially cut the edge of the strips, means carried by the free extremities of the arms for gripping the opposite edges of the cut portion, means for swinging the arms to effect relative separation thereof whereby to tear the material, and means for returning said arms and the knife to normal position and for releasing the gripping means.

CHESTER HERRICK CLIFT.